Sept. 9, 1958     A. MARTINEZ B.     2,851,305
IRRIGATING SPRINKLER
Filed July 11, 1955
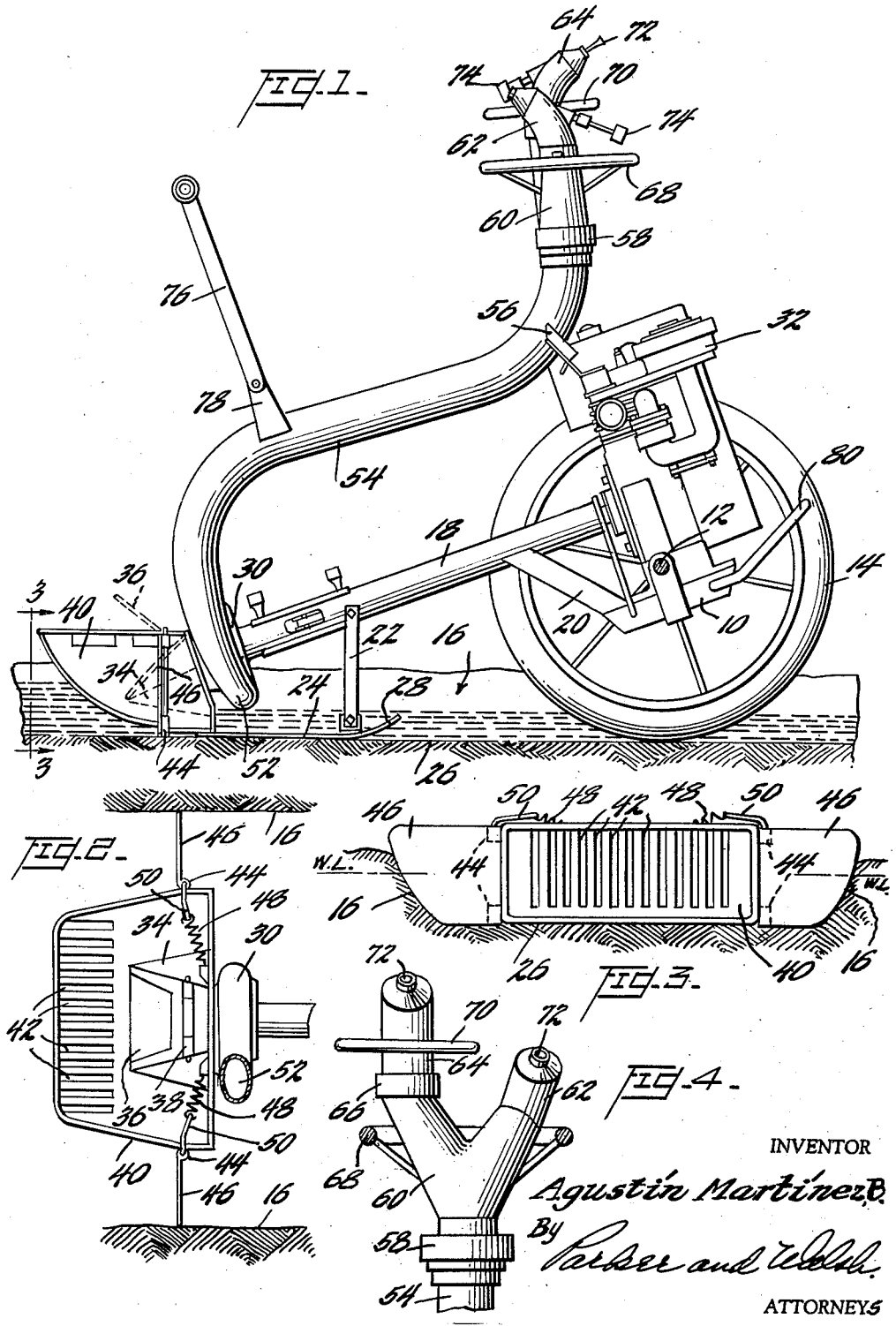
INVENTOR
Agustin Martinez B.
By Parker and Welsh
ATTORNEYS

2,851,305

IRRIGATING SPRINKLER

Agustin Martinez B., Mexico City, Mexico

Application July 11, 1955, Serial No. 521,299

Claims priority, application Mexico July 13, 1954

7 Claims. (Cl. 299—52)

This invention relates to an irrigating sprinkler.

In order to obtain the most efficient use of water for irrigation, it is necessary for the water to be spread uniformly over the ground to be irrigated. The degree of uniformity required varies according to the type of crop being grown. In order to transfer the water from its primary source to the growing crops, a variety of means have been employed but most of them have been either excessively expensive or uneconomical of the water employed.

One method widely used has been the plowing of comparatively shallow furrows from four inches to a foot deep, across the land to be irrigated. These furrows are sufficiently shallow so that they do not materially alter the face of the ground. In subsequent seasons, they may be completely obliterated by further plowing or other surface treatment. However, the disadvantage of furrows such as these is that, if a great number of them are not employed, there is substantial wastage of water.

My invention relates to an irrigating sprinkler that may be employed in conjunction with such furrows to spread water over the land by sprinkling. Because of its light, inexpensive construction, it may be handled easily and used more widely than expensive devices heretofore proposed.

The device of this invention is especially adapted to be used in connection with shallow furrows to take up water from them and distribute it by sprinkling over a wide area.

The device is also characterized by its adjustability in that the water may be spread in variable patterns and its direction of application may be adjusted to overcome changes in the direction of the wind.

For a fuller understanding of the invention, reference is made to the accompanying drawing wherein:

Figure 1 is a side elevation, partly in section, of the device;

Figure 2 is a plan view of the intake mechanism;

Figure 3 is an elevation, taken from the rear, of the intake mechanism; and Figure 4 is a front elevation view, taken partly in section, of the spray heads.

As shown in Figure 1 the device has a light frame 10 suspended from axle 12, passing between wheels 14. The wheels are set comparatively close together so that both may ride between the sidewalls of the irrigating ditch.

The frame 10 is provided with a tubular extension 18, secured to the main body of the frame by means of braces 20. Extending downwardly from the rear portion of extension 18 are legs 22 to which are attached flat skids 24 for engaging the lower surface of the irrigation ditch 26. The forward ends of skids 24 are turned up at 28 to facilitate forward movement of the apparatus.

At the rear end of extension 18 is located a centrifugal pump 30 driven by gasoline motor 32 and connected thereto by a shaft passing through extension 18.

The pump is set low on the outer end of extension 18 so that it can take suction in as little as two inches of water. The intake is surrounded by housing 34, having sealed inspection plate 36, hinged at 38 so that it may be raised to the position shown in dotted lines in Figure 1 for cleaning purposes.

The housing 34 is surrounded by open topped basket 40 having a plurality of slots 42 therein. The slots 42 serve to screen out trash and plate 36 may be opened for access to the pump impeller. The basket 40 is secured by its rear wall to the casing of pump 30 and, on the bottom, to skids 24.

Hinged at 44, arcuate plates 46 are normally held at substantially right angles with the walls 16 of the ditch by means of springs 48 attached to the inwardly bent pintles of hinges 44. It will thus be seen that plates 46 are normally urged outwardly toward the sidewall 16 of the ditch to seal the front portion of the ditch from the rear portion along a plane passing through pivot lines 44 of the hinged plates 46.

The outlet 52 of the pump 30 is connected to a riser 54 which turns forwardly and thence upwardly. It is connected by braces 56 to the frame 10 of the machine.

The riser 54 terminates in a rotary joint 58 for the Y 60 so that the Y may be rotated 360° in a horizontal plane. The Y 60 terminates in two spray nozzles 62 and 64, the nozzle 64 being seated in another rotary joint 66, whereby nozzle 64 may be rotated with respect to Y 60. Hand wheel 68 is provided for Y 60 and hand wheel 70 is located on nozzle 64 so that, by rotating the two with respect to each other and with respect to the riser 54, the two nozzles may be placed at any desired angle to each other and with respect to the machine itself. Each nozzle is provided with a tapered plug 72 adjustable by means of thumb wheels 74 to provide any type of discharge from a long jet to a fan-wise spray. By placing nozzle 64, slightly above nozzle 62, clearance is provided for easier adjustment.

The apparatus may be pulled alone by means of handle 76 pivoted to plate 78 welded to riser 54 and, a second handle 80, affixed to the front end of the frame 10 may also be employed.

In operation, it is preferred to carry the device to the outermost ends of the irrigation furrows with the front end of the machine facing outwardly. Sprinkling is begun at this point, the nozzles 62 and 64 being adjusted to deliver the most desirable type of spray for the particular type of crop to be irrigated. The two nozzles and the Y can be arranged to direct the spray in any desired direction and they can be independently adjusted to overcome any prevailing wind at the time of spraying. As the desired saturation is reached at the outer end of the ditch, the machine may be pulled backwardly by means of handle 76 to a new position. As the machine is pulled along the ditch, the plates 46 extend resiliently outward to substantially seal the ditch against water passing from the rear of the machine to the front, thus economizing on the water supply. When the machine has traversed an entire ditch, the head end of the ditch can be dammed off until additional irrigation is desired.

Obviously, many modifications and variations of the present invention are possible in the light of the teachings without departing from the spirit of the invention as defined in the appended claims.

I claim:

1. An apparatus for traversing the length of shallow irrigation ditches to pump water therefrom and spray it broadcast over the surrounding land including a frame supported by a pair of wheels, a rearwardly extending and downwardly inclined extension of the frame, a skid mounted on the extension for supporting the outer end of the extension, said skid being adapted to glide lengthwise along an irrigation canal, in either direction, a pump mounted on the outer end of the extension, having its intake located just above the low point of said outer end, means mounted on the frame for driving the pump, a riser extending from the discharge of the pump and a spray nozzle on the upper portion of the riser for broadcasting the discharge of the pump.

2. The apparatus of claim 1 including a strainer mounted on the intake of the pump.

3. The apparatus of claim 2 wherein the strainer has a rigid frame with the underside thereof adapted to lend support to the outer end of the frame.

4. The apparatus of claim 3 wherein the sides of the strainer are provided with flexibly mounted vanes for contacting the sides of the ditch to seal said ditch.

5. The apparatus of claim 1 wherein the riser is provided with a Y secured thereto by means of a collar permitting free rotation of the Y in a horizontal plane, each branch of the Y being provided with a spray nozzle.

6. The apparatus of claim 5 wherein the Y is provided with a horizontally extending handwheel for rotating it.

7. The apparatus of claim 5 wherein at least one of the nozzles is rotatable in a horizontal plane with respect to the Y.

References Cited in the file of this patent

UNITED STATES PATENTS

| | | |
|---|---|---|
| 1,102,354 | Pougnet | July 7, 1914 |
| 2,574,634 | Frampton | Nov. 13, 1951 |
| 2,718,433 | Poyner | Sept. 20, 1955 |